(12) United States Patent
Reddy

(10) Patent No.: US 7,467,620 B1
(45) Date of Patent: Dec. 23, 2008

(54) EVAPORATIVE EMISSION CONTROL SYSTEM WITH NEW ADSORBENTS

(75) Inventor: Sam R. Reddy, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/760,031

(22) Filed: Jun. 8, 2007

(51) Int. Cl.
*F02M 33/02* (2006.01)
*F02M 33/04* (2006.01)

(52) U.S. Cl. ........................... 123/520; 123/519
(58) Field of Classification Search .................. 123/520, 123/516, 518, 519, 198 D; 137/587–589, 137/43, 493
See application file for complete search history.

(56) References Cited

U.S. PATENT DOCUMENTS

| | | | |
|---|---|---|---|
| 5,393,329 A * | 2/1995 | Inagaki et al. | 96/131 |
| 5,408,976 A | 4/1995 | Reddy | |
| 5,599,384 A * | 2/1997 | Yoshida et al. | 96/143 |
| 6,279,548 B1 | 8/2001 | Reddy | |
| 6,769,415 B2 | 8/2004 | Reddy et al. | |
| RE38,844 E * | 10/2005 | Hiltzik et al. | 95/146 |
| 7,059,306 B2 | 6/2006 | Reddy | |
| 2006/0180127 A1* | 8/2006 | Hirano et al. | 123/520 |
| 2007/0012298 A1* | 1/2007 | Nakamura et al. | 123/509 |
| 2007/0113831 A1* | 5/2007 | Hoke et al. | 123/519 |

OTHER PUBLICATIONS

Sorbead H [online] Mar. 2007 [retrieved on Feb. 25, 2008]. Retrieved from the Internet:<URL:☐☐ www.catalysts.basf.com/Main/search/-sorbead/.*

* cited by examiner

*Primary Examiner*—Mahmoud Gimie

(57) ABSTRACT

One embodiment of the invention includes an adsorbent canister in a vehicle and an adsorbent having a nearly linear isotherm provided in the adsorbent canister.

14 Claims, 5 Drawing Sheets

EVAPORATIVE EMISSION CONTROL SYSTEM WITH NEW ADSORBENTS

TECHNICAL FIELD

The field to which the disclosure generally relates includes methods and systems for evaporative emission control for hybrid and non-hybrid vehicles, and more specifically to methods and systems for reducing and preventing vapor emissions from fuel tanks of such vehicles.

BACKGROUND

Gasoline typically includes a mixture of hydrocarbons ranging from higher volatility butanes ($C_4$) to lower volatility hydrocarbons ($C_8$ to $C_{10}$). When vapor pressure increases in the fuel tank due to conditions such as higher ambient temperature or displacement of vapor during filling of the tank, fuel vapor flows through openings in the fuel tank. To prevent fuel vapor loss into the atmosphere, the fuel tank is vented into a canister (known as an evaporative canister or adsorbent canister) that contains an adsorbent material such as activated carbon granules or pellets. The evaporative canister is part of a system directed to controlling the emission of fuel vapors generated by fuel carried in the vehicle's fuel system. These evaporative emission control systems ("EVAP" systems) are implemented as a collateral system to the fuel system.

When the gasoline tank is filled, fuel vapor accumulates in the canister. The fuel vapor is a mixture of gasoline vapor (referred to in this description also by its main component, hydrocarbon vapor) and air. The initial loading may be at the inlet end of the canister, but over time the fuel vapor is gradually distributed along the entire bed of the adsorbent material. As the fuel vapor enters an inlet of the canister, the hydrocarbon vapor is adsorbed onto activated carbon granules and the air escapes into the atmosphere. The size of the canister and the volume of the adsorbent activated carbon are selected to accommodate the expected gasoline vapor generation.

After the engine is started, the control system uses engine intake vacuum to draw air through the adsorbent to desorb the fuel. A purge valve between the vehicle's engine and the EVAP system opens and air is drawn through the canister. The air removes fuel vapor that is stored in the adsorbent material. The desorbed fuel vapor is directed into an air induction system of the engine as a secondary air/fuel mixture to be consumed in the normal combustion process.

In a hybrid vehicle including both an internal combustion (IC) engine and an electric motor, the IC engine is turned off nearly half of the time during vehicle operation. Because the purging takes place only during operation of the IC engine when the desorbed vapor can be consumed in engine combustion, in a hybrid vehicle the adsorbent canister purging with fresh air occurs less than half of the time. A hybrid vehicle generates nearly the same amount of evaporative fuel vapor as does a conventional vehicle having an IC engine. Therefore, the lower purge rate of the hybrid vehicle is not sufficient to clean the adsorbed fuel out of the adsorbent canister.

SUMMARY OF EXEMPLARY EMBODIMENTS OF THE INVENTION

One embodiment of the invention includes an adsorbent canister in a vehicle and an adsorbent having a nearly linear isotherm provided in the adsorbent canister.

Other exemplary embodiments of the invention will become apparent from the detailed description of exemplary embodiments provided hereinafter. It should be understood that the detailed description and specific examples, while indicating the exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings.

DETAILED DESCRIPTION OF EXEMPLARY EMBODIMENTS

The following description of the embodiments is merely exemplary in nature and is in no way intended to limit the invention, its application, or uses.

According to one embodiment of the invention, an adsorbent canister is provided in a vehicle. Evaporative fuel vapors (mainly diurnal and refueling) are stored in the adsorbent canister where the adsorbent traps the hydrocarbons from the fuel vapors. The evaporative fuel vapors are purged from the canister with ambient air and consumed in the engine combustion. An adsorbent with a nearly linear isotherm is provided in the adsorbent canister. The term "nearly linear isotherm" as used herein means that the amount of absorbed vapor in a given volume of the absorption material does not deviate more than 40% from a straight line for a pretrial pressure from 0-0.5 atm at a given temperature (e.g. 25° C. in FIG. 4). Fuel vapor generation in a typical vehicle may be, for example, about 30 g/day for diurnal, 80 g/fill for refueling, and 10 g/trip for running loss.

Figure 1:
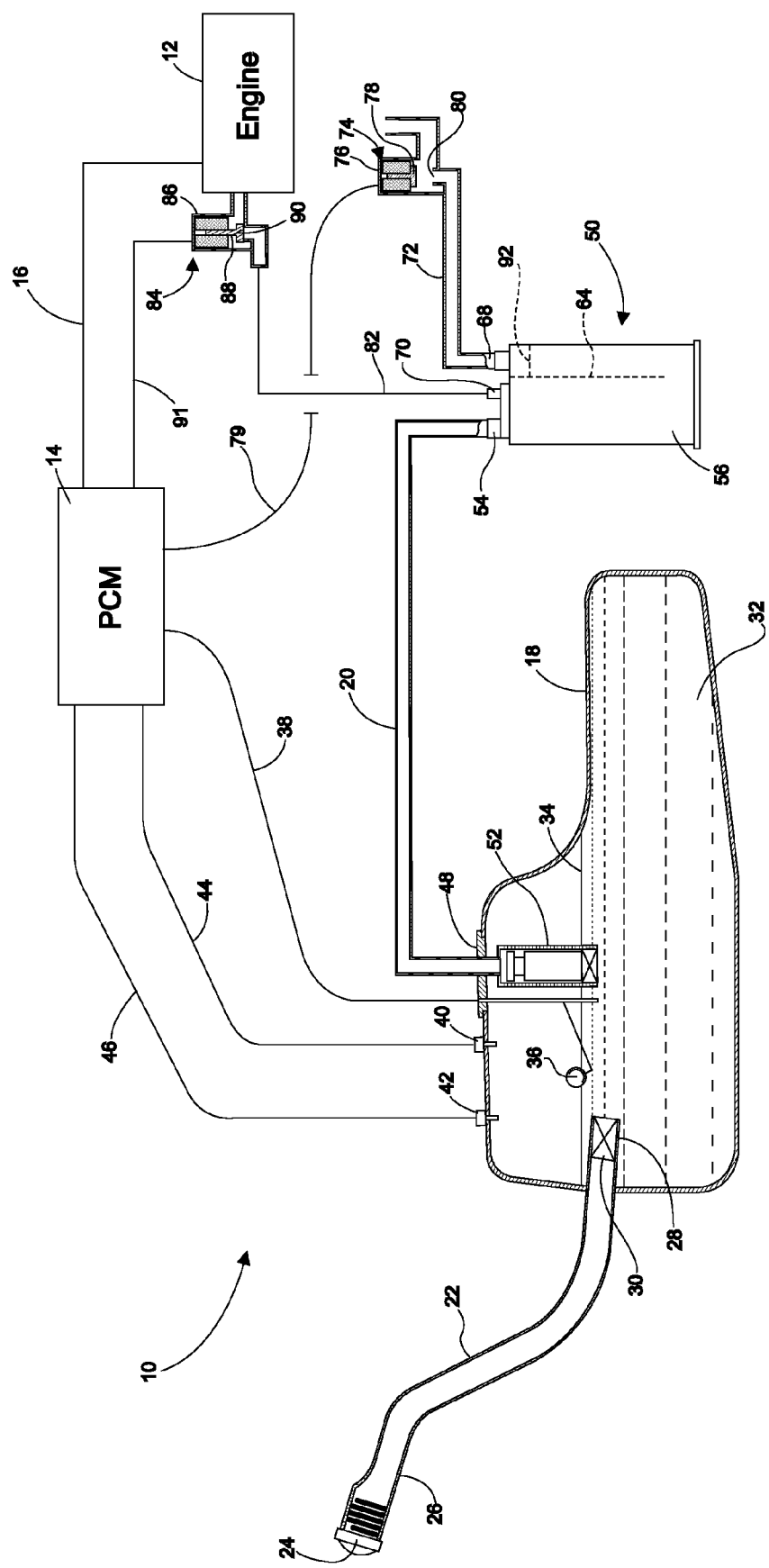
FIG. 1 illustrates an evaporative control system for a vehicle according to one embodiment of the invention.

Referring now to FIG. 1, an evaporative control system 10 for a hybrid vehicle including an IC engine 12 and an electric motor (not shown) according to one embodiment of the invention is illustrated. Hybrid vehicles combine a gasoline fueled IC engine and an electric motor to provide a hybrid powertrain with improved fuel economy. Frequent on-off engine operation results in much smaller canister purge air volume for a hybrid vehicle. Because the IC engine does not operate nearly 50% of the time, canister purging with fresh air occurs less than 50% of the time during vehicle operation. In one embodiment, the IC engine 12 is controlled by a controller 14. The controller 14 may be a separate controller or may form part of an engine control module (ECM), a powertrain control module (PCM), or any other vehicle controller. In various embodiments, the IC engine 12 may burn gasoline, ethanol, or other volatile hydrocarbon-based fuels.

When the IC engine 12 is started, the controller 14 may receive signals from one or more engine sensors, transmission control devices, and/or emissions control devices. Line 16 from the engine 12 to the controller 14 schematically depicts the flow of sensor signals. During operation of the IC engine 12, gasoline is delivered from a fuel tank 18 by a fuel pump (not shown) through a fuel line (not shown) to a fuel rail (not shown). Fuel injectors (not shown) inject gasoline into cylinders of the IC engine 12 or to ports that supply groups of cylinders. The timing and operation of the fuel injectors and the amount of fuel injected are managed by the controller 14.

The fuel tank 18 is typically a closed container except for a first vent line 20. The fuel tank 18 is often made of blow molded, high density polyethylene provided with one or more gasoline impermeable interior layer(s). The fuel tank 18 is connected to a fill tube 22. A gas cap 24 closes a gas fill end 26 of the fill tube 22. The outlet end 28 of the fill tube 22 is located inside of the fuel tank 18. A one-way valve 30 prevents gasoline 32 from splashing out of the fill tube 22. An upper surface of the gasoline is identified at 34. A float-type fuel level indicator 36 provides a fuel level signal at 38 to the controller 14. In various embodiments, a pressure sensor 40 and a temperature sensor 42 optionally provide pressure and temperature signals 44 and 46 to the controller 14.

The fuel tank 18 includes a first vent line 20 that extends from a seal 48 on the fuel tank 18 to a canister 50. A float valve 52 within the fuel tank 18 prevents liquid gasoline from entering the vapor first vent line 20. Fuel vapor pressure increases as the temperature of the gasoline increases. Vapor flows under pressure through the first vent line 20 to the vapor inlet of the canister 50. The vapor enters a canister vapor inlet 54, flows past a retainer element (not shown), and diffuses into the canister 50. The canister 50 contains an adsorbent material 56 having a nearly linear or linear isotherm. The adsorbent material 56 may be a weak adsorbent, may have a high saturation capacity (for example greater than 20 g/100 cc), have a large pore volume (for example greater than 600 cubic centimeters (cc) per liter compared to activated carbon pore volume of 400 cc per liter), may have a slightly favorable isotherm (for example nearly linear compared to highly non-linear isotherm of activated carbon), and may have a low interaction energy (for example less than half of that of carbon).

The canister 50 may be formed of any suitable material, for example, molded thermoplastic polymers such as nylon. In one embodiment, the canister 50 may have separate chambers of adsorbent material 56 defined by a vertical internal wall 64 and a horizontal internal wall 92. The walls 64 and 92 may be porous to allow vapor to pass through. The vapor may pass through all chambers of the adsorbent material 56, with the air exiting through a first vent opening 68 at the top of the canister 50. The first vent opening 68 also serves as an inlet for the flow of air past a retainer element (not shown) during purging of adsorbed fuel vapor from the adsorbent material 56. A purge outlet 70 is also formed in the top of the canister 50 through which a stream of purge air and purged fuel vapor can exit the canister 50.

Connected to vent opening 68 may be a second vent line 72 and a solenoid actuated vent valve 74. The vent valve 74 is normally open as shown, but upon actuation of a solenoid 76, the solenoid 76 moves a stopper 78 to cover a second vent opening 80. The solenoid 76 is actuated by a controller 14 through a signal lead 79. The vent valve 74 is usually closed for diagnostic purposes only. As an air/fuel mixture flows from the fuel tank 18 through first vent line 20 and through the canister vapor inlet 54 into canister 50, fuel vapor will be absorbed onto the adsorbent material 56 in the canister. When vent valve 74 is open and the adsorbent material 56 becomes saturated with vapor, then vapor will accompany air exiting the canister at the first vent outlet 68 and pass through second vent line 72 and through the open solenoid-actuated valve 74.

The purge outlet 70 is connected by a purge line 82 through a solenoid actuated purge valve 84 to the IC engine 12. The purge valve 84 includes a solenoid 86 and a stopper 88 that selectively close a third vent opening 90. Purge valve 84 is operated by the controller 14 through a signal lead 91 when the IC engine 12 is running and can accommodate a fuel-laden air stream drawn through canister 50. When the engine is operating, the controller 14 opens the purge valve 84 to allow air to be drawn past the vent valve 74. The air flows through the second vent line 72 and into the vent opening inlet 68. In the canister 50, the air becomes laden with desorbed fuel vapor and exits the purge outlet 70. The fuel-laden air is drawn through the purge line 82 and the purge valve 84 into the engine 12.

Figure 2:
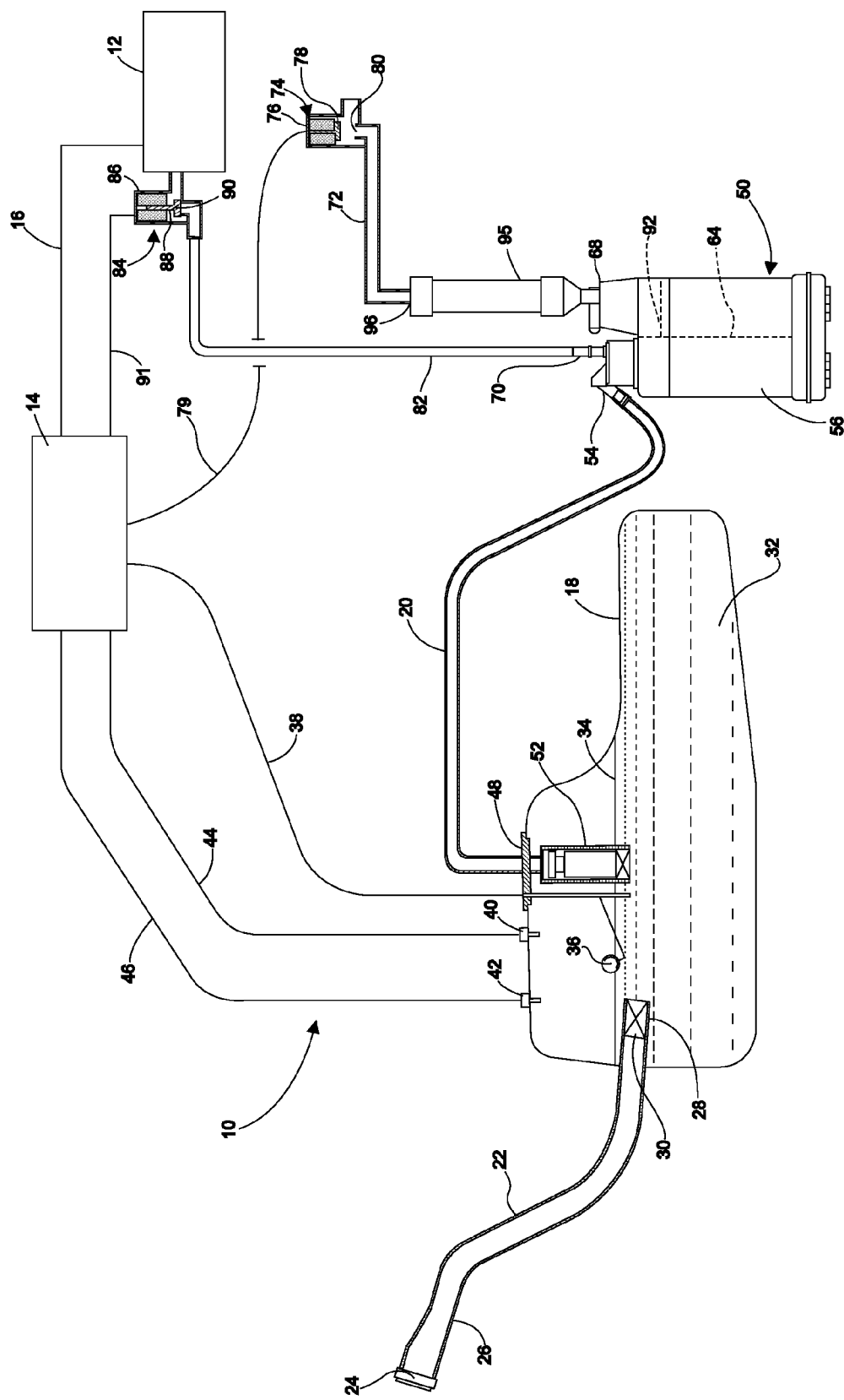
FIG. 2 illustrates an evaporative control system for a vehicle according to one embodiment of the invention.

Referring now to FIG. 2, in another embodiment, an optional scrubber 95 containing a carbon material 98 is coupled to the first vent opening 68. The carbon material 98 may be, for example, activated carbon fiber material or carbon monolith. The scrubber may be made of any suitable material, for example molded thermoplastic polymers such as nylon or polycarbonate. Air leaving the canister 50 may flow through the scrubber. The carbon material 98 adsorbs emissions contained in the air. At the other end from the canister 50, the scrubber 95 is connected through a third vent opening 96 to the second vent line 72 and the solenoid actuated vent valve 74.

In the embodiment shown in FIG. 2, as an air/fuel mixture flows from the fuel tank 18 through the first vent line 20 and the canister vapor inlet 54 into the canister 50, hydrocarbons from the vapor are adsorbed by the adsorbent material 56 in the canister 50. Lower molecular weight hydrocarbons, such as butanes and pentanes, due to being smaller in size and more volatile, may be lost as bleed emissions. The air and bleed emissions passing through the first vent opening 68 pass through the scrubber canister 95, where the bleed emissions are adsorbed by the carbon material 98.

In one embodiment of the invention including the optional scrubber 95, while the hybrid vehicle's IC engine 12 is operating, purge air is drawn through scrubber 95 to draw desorbed vapor into engine 12 for combustion. During purging, controller 14 opens the purge valve 84 to allow air to be drawn past the vent valve 74. The air flows through the second vent line 72, scrubber 95, first vent opening 68, and canister 50. In other words, air is drawn through the carbon material 98 and the adsorbent material 56. The air becomes laden with desorbed hydrocarbons and exits through the purge outlet 70. The fuel-laden air is drawn through the purge line 82 and the purge valve 84 into the IC engine 12.

Figure 3:
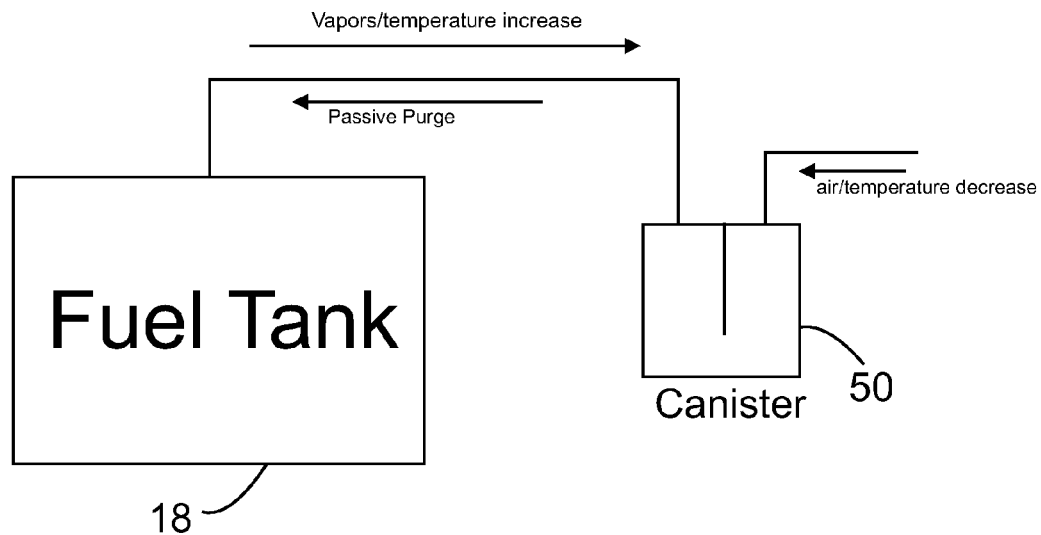
FIG. 3 illustrates an evaporative control system for a vehicle according to one embodiment of the invention.

Referring now to FIG. 3, in another embodiment a passive purge system provides a simple and inexpensive way to control emissions. When a vehicle's fuel tank temperature decreases when the engine is not running, for example while the vehicle is parked, the pressure in the tank 18 decreases. The pressure in the tank decreases due to the thermal contraction of the gas phase and due to the decrease in the vapor pressure of fuel in the tank. The decrease in fuel tank pressure causes some air to flow from the canister 50 into the fuel tank, which results in canister back-purge. The back-purged hydrocarbons may condense in the fuel tank. The amount of canister back-purge may depend on the amount of vapors in the canister, the tank vapor space volume, the Reid Vapor Pressure (RVP) of the tank fuel, and the decrease in tank temperature. When the ambient temperature increases, the fuel tank 18 may expel fuel vapors which are then stored in the canister 50.

Passive purge may result in partial emissions control, for example about 50%. The adsorbent material 56 may increase the effectiveness of passive purge by increasing the amount of vapor back-purged with the same amount of purge air. The passive canister purge may be used, for example, in lawn mower engines and off-highway recreational vehicles which do not have any vapor emission control systems.

The adsorbent material 56 may result in improvements to the evaporative emission control system by reducing the size of the canister by more than 50% and reducing the purge air flow requirement by more than 75%. Adsorption/desorption and load/purge characteristics of an adsorbent may be described by its isotherm. The adsorbent material 56 has a nearly linear or linear isotherm.

Figure 4:
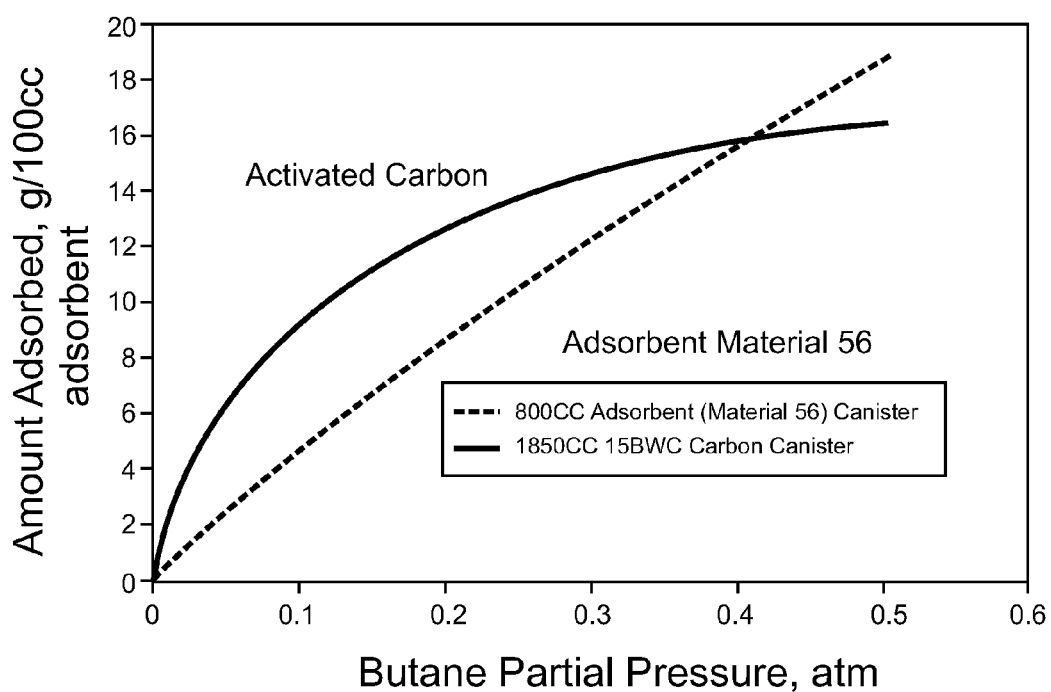
FIG. 4 illustrates the isotherms for activated carbon and an adsorbent having a nearly linear or linear isotherm.

Referring now to FIG. 4, the isotherms of a commonly used adsorbent (activated carbon) and the adsorbent material 56 are provided. Because the adsorbent material 56 has a nearly linear or linear isotherm, it can adsorb an increasing amount of fuel vapors as the partial pressure of adsorbing fuel vapor increases at a constant temperature. The adsorbent material 56 may be, for example, Sorbead H, available from Engelhard Corporation (Iselin, N.J.). Sorbead H is an alumino-silicate gel formed into hard, spherical beads. Sorbead H includes 97 weight % $SiO_2$ and 3 weight % $Al_2O_3$. Sorbead H has a surface area of 750 $m^2/g$; a pore volume of 0.5 $cm^3/g$; a packed bulk density of 44 $lb/ft^3$; a crushing strength of >200 N; and an attrition rate of <0.05 wt %. Adsorbents which meet the characteristics of the adsorbent material 56 may also be commercially available from other companies such as Air Products.

The adsorbent material 56 may have some or all of the following properties: high pore volume; low interaction energy with hydrocarbons; high saturation capacity; weak adsorbent; and a nearly linear or linear isotherm, which is a slightly favorable isotherm. Due to these properties, the adsorbent material 56 purges easily and results in very little or no heel, which is the residual hydrocarbons remaining on the adsorbent and requiring large volumes of purge air to purge. Reducing the purge air volume may improve the engine air/fuel control problem, for example in hybrid vehicles, which operate with reduced purge due to engine on-off operation.

Figure 5:
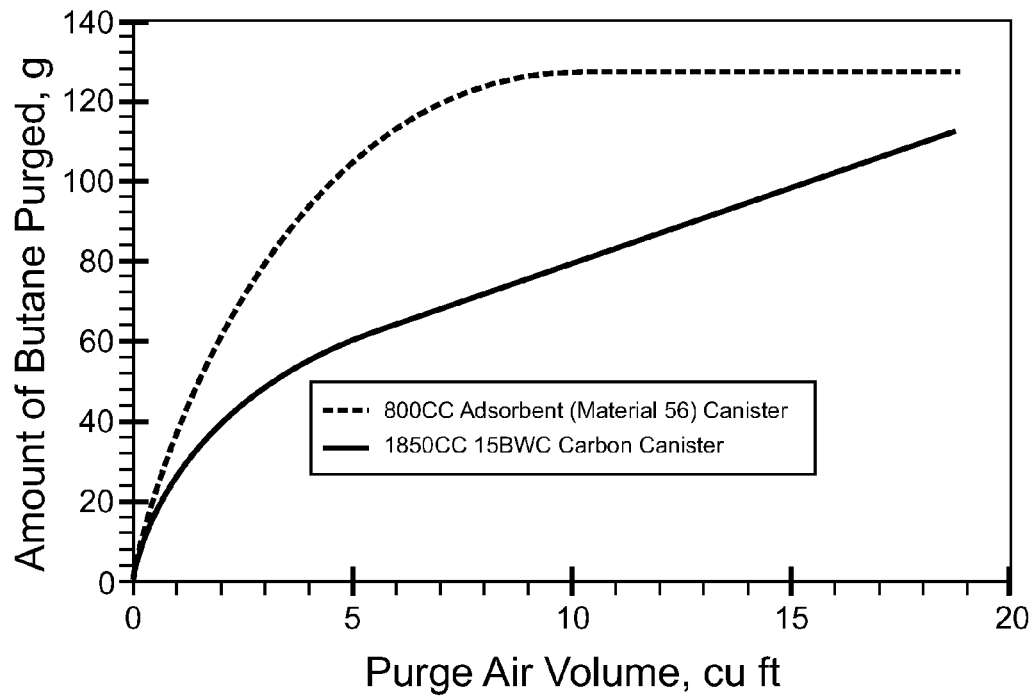
FIG. 5 illustrates hydrocarbon purging for activated carbon and an adsorbent having a nearly linear or linear isotherm.
Figure 6:
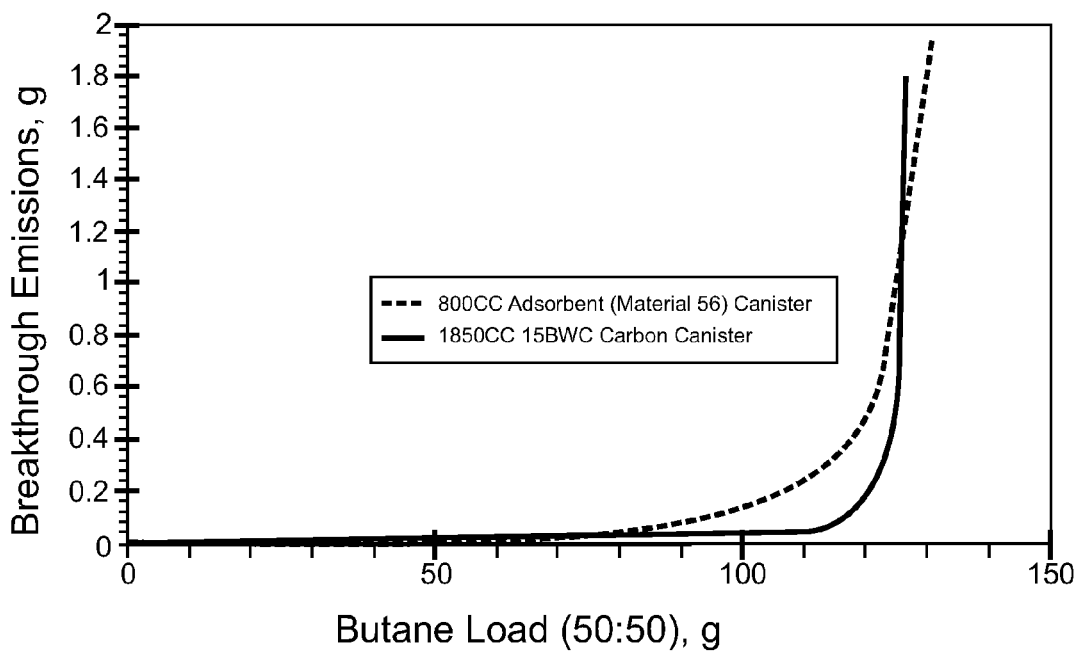
FIG. 6 illustrates hydrocarbon storage capacities for activated carbon and an adsorbent having a nearly linear or linear isotherm.

Mathematical models were used to predict the performance of a canister with the adsorbent material 56 in vehicle evaporative emission control. Referring now to FIG. 4, the hydrocarbon storage capacities of the activated carbon and the adsorbent material 56 are compared. Referring now to FIG. 5, the hydrocarbon purging capacities of the activated carbon and the adsorbent material 56 are compared. The activated carbon builds heel, but the use of the adsorbent material 56 results in little or no heel build up. Therefore, the volume of an adsorbent canister needed for a typical vehicle evaporative system is very small for the adsorbent material 56, for example 800 cc, compared to a canister volume of 1850 cc for activated carbon. For example, for a 15 gallon fuel tank 800 cc of Sorbead H in a canister may be sufficient to adsorb emissions from the tank. FIG. 6 compares the adsorption or vapor storage characteristics of the same two adsorbent canisters by loading to 2-g breakthrough with butane containing 50% air. Both adsorbents adsorbed about the same amount of vapor. As shown in FIG. 5, however, the adsorbent canister with the adsorbent material 56 purges very rapidly, and it takes less than 4 cubic feet of air to purge 100 g of butane. The adsorbent canister with the activated carbon purges slowly and requires more than 15 cubic feet of purge air to purge 100 g of butane.

Figure 7:
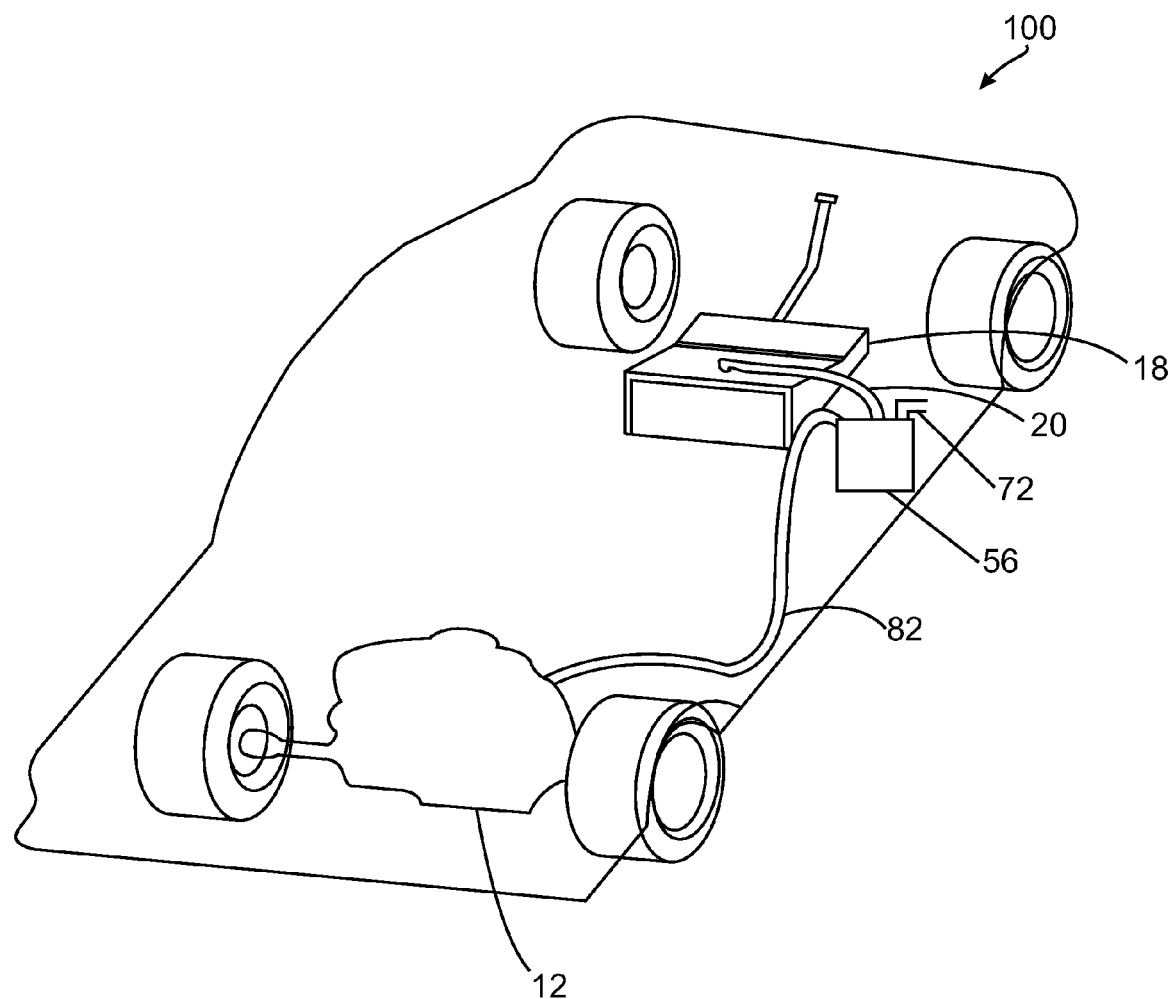
FIG. 7 is a view of a vehicle containing an evaporative control system according to one embodiment of the invention.

Referring now to FIG. 7, in one embodiment, the evaporative emission control system is used in a vehicle 100. The evaporative control system includes the fuel tank 18 connected by the first vent line 20 to the canister 56, the canister 56 is connected to the IC engine 12 by purge line 82, and the second vent line 72. In one embodiment, the vehicle 100 is a hybrid vehicle. In another embodiment, the vehicle 100 is a Partial Zero Emissions Vehicle (PZEV). In yet another embodiment, the vehicle 100 is a conventional gasoline vehicle.

The above description of embodiments of the invention is merely exemplary in nature and, thus, variations thereof are not to be regarded as a departure from the spirit and scope of the invention.

What is claimed is:

1. An evaporative emissions control system for a vehicle, comprising:
    a fuel tank for storing a volatile fuel;
    an engine having an air induction system;
    at least one canister containing an adsorbent material, wherein the adsorbent material has a nearly linear isotherm;
    a vapor inlet on the canister coupled to the fuel tank;
    a purge outlet on the canister coupled to the air induction system;
    a first vent opening on the canister for allowing fuel vapor to enter and exit said canister;
    a scrubber canister fluidically coupled to canister through said first vent opening, said scrubber canister including an activated carbon adsorbent material;
    wherein the adsorbent material and said activated carbon adsorbent material adsorbs fuel vapors when the engine is not running and desorbs fuel vapors when the engine is running.

2. An evaporative emissions control system for a vehicle as set forth in claim 1 wherein the adsorbent material consists essentially of an alumino-silicate gel comprising 97 weight % $SiO_2$ and 3 weight % $Al_2O_3$.

3. An evaporative emissions control system for a vehicle as set forth in claim 1 wherein the engine is integrated with a hybrid powertrain.

4. An evaporative emissions control system for a vehicle as set forth in claim 1 wherein the canister has a volume of about 800 cc to about 1200 cc.

5. An evaporative emission control system for a vehicle as set forth in claim 1 wherein the adsorbent material has a surface area of at least 750 $m^2/g$.

6. An evaporative emission control system for a vehicle as set forth in claim 1 wherein the adsorbent material has a pore volume of at least 0.5 $cm^3/g$.

7. An evaporative emission control system for a vehicle as set forth in claim 1 wherein the adsorbent material has an attrition rate less than 0.05 wt %.

8. A method for reducing purge air flow requirements of an evaporative emissions control system for a vehicle comprising:
    storing a volatile fuel in a fuel tank;
    providing at least one canister containing an adsorbent material and including a first vent opening, wherein the adsorbent material has a nearly linear isotherm;
    coupling a vapor inlet of the canister to the fuel tank;
    coupling a purge outlet of the canister to an air induction system of an engine of the vehicle;

fluidically coupling a scrubber canister having an activated carbon adsorbent material to the canister through said first vent opening;

adsorbing fuel vapors when the engine is not running using the adsorbent material and the activated carbon adsorbent material; and desorbing fuel vapors from the adsorbent material and from the activated carbon adsorbent material when the engine is running.

9. A method for reducing purge air flow requirements of an evaporative emissions control system for a vehicle as set forth at claim 8 wherein the canister has a volume of about 800 cc to about 1200 cc.

10. A method for reducing purge air flow requirements of an evaporative emissions control system for a vehicle as set forth at claim 8 wherein the adsorbent material consists essentially of an alumino-silicate gel comprising 97 weight % $SiO_2$ and 3 weight % $Al_2O_3$.

11. A method for reducing purge air flow requirements of an evaporative emissions control system for a vehicle as set forth at claim 8 wherein the engine is integrated with a hybrid powertrain.

12. A hybrid vehicle comprising an internal combustion engine and an electric motor, the hybrid vehicle further comprising:

a fuel tank for storing a volatile fuel;

an engine having an air induction system;

at least one canister containing an adsorbent material, wherein the adsorbent material has a nearly linear isotherm;

a vapor inlet coupled to the fuel tank;

a purge outlet coupled to the air induction system;

a first vent opening on the canister;

a scrubber canister fluidically coupled to the canister through said first vent opening, said scrubber canister including an activated carbon adsorbent material;

wherein the adsorbent material and said activated carbon adsorbent material adsorbs fuel vapors when the engine is not running and desorbs fuel vapors fuel vapors when the engine is running.

13. A hybrid vehicle as set forth in claim 12 wherein the adsorbent material consists essentially of an alumino-silicate gel comprising 97 weight % $SiO_2$ and 3 weight % $Al_2O_3$.

14. A hybrid vehicle as set forth in claim 12 wherein the canister has a volume of about 800 cc to about 1200 cc.

* * * * *